United States Patent

[11] 3,602,033

| [72] | Inventors | George R. Burrell<br>Houston;<br>Dennis G. Perkins, Bellaire, both of, Tex. |
|---|---|---|
| [21] | Appl. No. | 837,742 |
| [22] | Filed | June 30, 1969 |
| [45] | Patented | Aug. 31, 1971 |
| [73] | Assignee | Esso Production Research Company |

[54] CALIBRATION METHOD FOR PERCENT OIL DETECTOR
8 Claims, 1 Drawing Fig.

[52] U.S. Cl. ..................................................... 73/1 R
[51] Int. Cl. .............................................. G01n 27/00
[50] Field of Search ............................................ 73/1 A; 324/74

[56] References Cited
UNITED STATES PATENTS

| 3,390,327 | 6/1968 | Bosworth et al. ............. | 324/74 |
| 3,187,551 | 6/1965 | Hill ............................... | 73/3 |
| 3,218,841 | 11/1965 | Lerner ......................... | 73/1 (A) |
| FOREIGN PATENTS | | | |
| 649,311 | 9/1962 | Canada ......................... | 73/1 |

Primary Examiner—S. Clement Swisher
Attorneys—Thomas B. McCulloch, Melvin F. Fincke, John B. Davidson, John S. Schneider, Sylvester W. Brock, Jr. and Kurt S. Myers ABSTRACT: Method and apparatus for rapidly calibrating, under dynamic conditions, sensing means for sensing the percentage of constituents (e.g., oil and water) in a fluid mixture (e.g., crude oil) flowing through fluid passageway (e.g., a pipeline), and generating a quantitative response indicative of that percentage. A calibrated sensor, which generates a reference signal having a quantitative response indicative of the true percentage of constituents in the fluid mixture, is arranged with the sensing means in a spacing which permits the calibrated sensor to sense and respond to essentially the same portion of a fluid mixture flowing through the passageway as sensed and responded to by the sensing means. Contemporaneously with the generation of these responsive signals, a selected characteristic of the signal generated by the sensing means is compared with the identical characteristic of the reference signal by comparison means which indicate the direction and degree of adjustment to be made to the sensing means to cause the quantitative response of the sensing means to a portion of fluid mixture to match the quantitative response of the calibrated sensor to that same portion. The sensing means is calibrated by making the indicated adjustment.

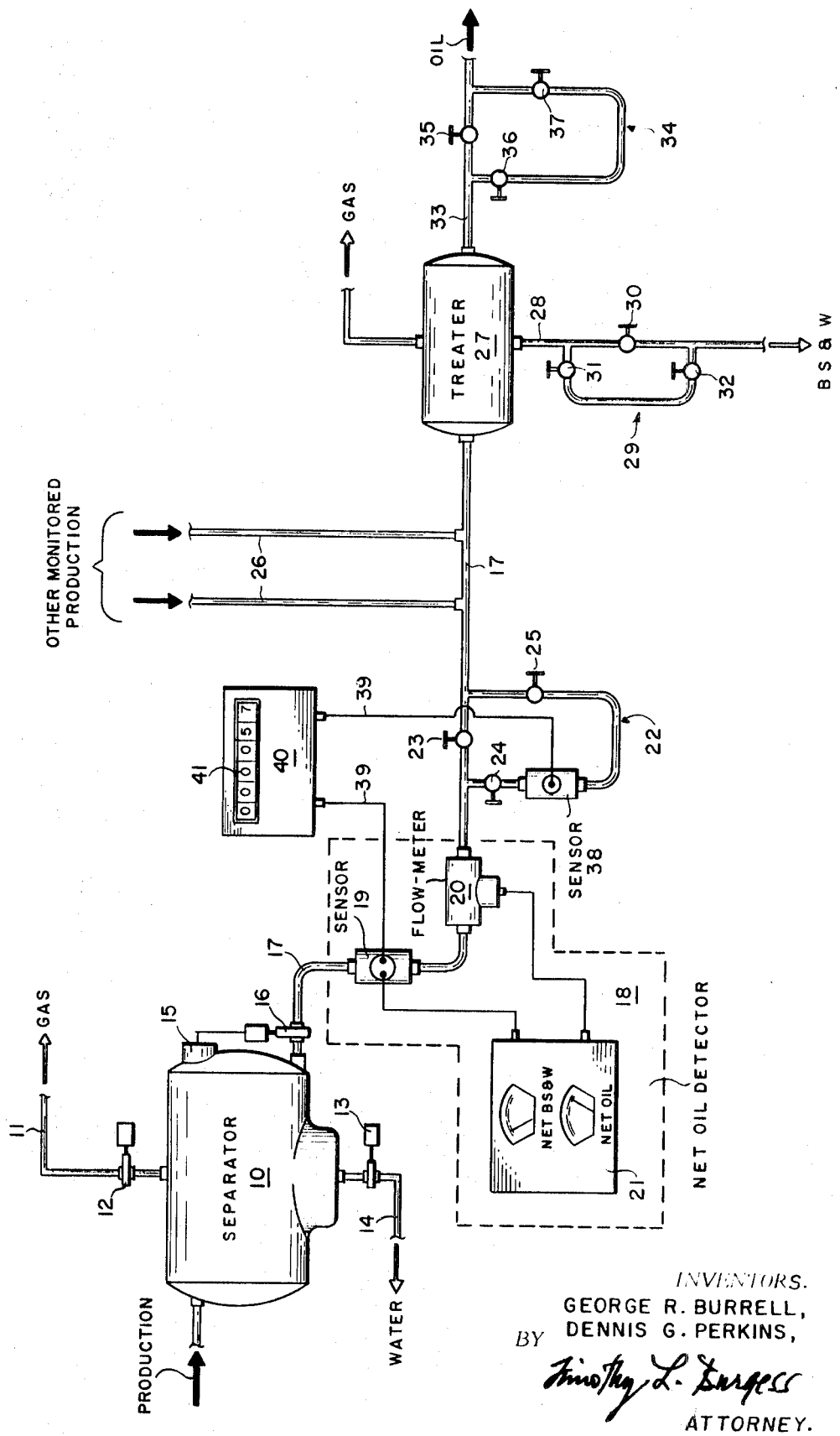

CALIBRATION METHOD FOR PERCENT OIL DETECTOR

BACKGROUND OF THE INVENTION

1. Field of the Invention

This invention relates to methods and apparatus for calibrating and proving sensors employed to detect the percentage of constituents in a fluid mixture flowing through a fluid passageway. More particularly, it involves calibration-sensing devices used in the detection of net oil and net BS&W (basic sediments and water) in crude oil flowing through a pipeline.

2. Description of the Prior Art

Net oil detectors are comprised essentially of three components: a pipeline sensor for detecting the percent of oil and/or BS&W (basic sediments and water) in a flowing crude oil stream, a flowmeter in series with the pipeline sensor, and a net oil computer which combines the signals of the sensor and the flowmeter and computes the net oil and net BS&W in the crude delivered from the lease, usually with both instantaneous and cumulative readouts over a given production period.

Net oil detectors are used in the commingled leases system of gathering crude oil production for emulsion-breaking treatment. In that system, the crude oil production of each lease is dynamically monitored for net content of oil by net oil detectors prior to its combination with the crude oil production of the other leases in the commingled system.

The summed readings of the net oil detectors of all of the leases must be substantially the same as the reading of a custody transfer point volume meter past which the treated commingled oil is flowed or royalty payments based on individual lease products cannot be made properly. To this end, and because aging, vibration and the like alter the performance characteristics of the electrical components of net oil computers, each component of the net oil detector must be periodically calibrated and proved. The component which has been most difficult and time consuming to calibrate has been the pipeline sensor.

The method heretofore used to calibrate the pipeline sensor made it necessary to shut in production of the lease being monitored by that sensor. After shutting in production, the pipeline is opened, and treated crude (as from a surge tank) is placed in the pipeline opposite the sensor, for determination of instantaneous zero BS&W response from an indicator on the net oil computer. The pipeline is then drained and salt water (from the formation being produced) is placed in the pipeline opposite the sensor, for determination of the proper response level (span) for 100 percent BS&W. Then the salt water is drained and production crude with a percent BS&W as low as possible is placed across the net oil detector to get a reading of the BS&W in the crude. A representative sample is taken from the crude stream as the BS&W reading is made, and the BS&W in the sample is volumetrically determined by shaking it out of the sample (using an emulsion breaker and a centrifuge). Then the BS&W percent of the sample is compared with the reading taken from the BS&W indicator to ascertain any difference and to obtain an estimate of the degree of adjustment to be made to the zero response of the pipeline sensor to make the response of the sensor linear from zero BS&W to the low BS&W percent measured. Pipeline runs and shakeouts are continued until satisfactory agreement between indicated BS&W and BS&W shakeout has been obtained. Then, the same painstaking procedure is followed with crude oil containing high BS&W percentages. The result desired is a slope of sensor response to BS&W (or conversely, oil) which is linear between zero and 100 percent BS&W.

Manifestly, this method of calibrating pipeline sensors of net oil detector units has not only required many man hours and loss of production time, in addition, it has produced built-in errors. The initial zero and span adjustments are taken on treated oil and formation water at an atmospheric pressure in a static condition, but the pipeline sensor, during operation, sees dynamic crude oil that is under pressure. In addition, the multiple sensors in the commingled gathering system can be unevenly calibrated because of the difficulties of conducting consistent volumetric shakeouts in the field.

SUMMARY OF THE INVENTION

This invention provides method and apparatus by which sensing means, such as used in net oil detectors, can be rapidly and accurately calibrated under dynamic conditions. The difficulties associated with known calibration techniques are overcome, in accordance with the invention, by comparing the responses of a sensing means and a calibrated sensor to essentially the same portion of a flowing fluid mixture while those responses are being produced to obtain an indication of the direction and degree of adjustment to be made to the sensing means to cause it to respond identically with the calibrated sensor to a portion of fluid mixture sensed by both the calibrated sensor and the sensing means.

BRIEF DESCRIPTION OF THE DRAWING

The FIGURE is a flow diagram schematically illustrating a system in which the general principles of the present invention may be carried out.

DESCRIPTION OF THE PREFERRED EMBODIMENTS

Referring now to the drawing, reference numeral 10 designates a separator which receives production from a wellhead on a lease forming part of a commingled gathering system. Well production from that lease is accumulated in separator 10 for gravity separation of salt water and gas from the crude oil. Separator 10, which is of conventional design, vents the gases to a gas transmission system by a line 11 regulated by back pressure valve 12. Gravity separated water from the production crude is discharged on actuation of a level-controlled dump valve 13 into a disposal line 14. When the lease separator has accumulated enough crude oil to ship, a level control 15 actuates dump valve 16 and passes the oil into pipeline 17, where it is dynamically monitored in transit by a net oil detector 18 for determination of net oil and net base sediments and water (BS&W) making up its volume. (Effluent crude oil from the separator may contain average amounts of basic sediments and water of from about 1–35 percent, but usually about 1–25 percent, mostly in a discontinuous phase.)

Net oil detector 18 is comprised of three basic components: a sensor 19 which detects physical properties reflecting the percentage of oil and BS&W in crude oil flowing through the pipeline 19; a flow meter 20 connected in series with sensor 19 to determine the volume of the fluid sensed by sensor 19; and a net oil computer 21 which correlates the outputs of sensor 19 and flow meter 20 for both instantaneous and cumulative readouts of the net volumes of BS&W and net oil passing through the pipeline 17 in a period of production.

A prover loop 22 is connected into pipeline 17. Crude is run into loop 22 by closing line valve 23 and opening loop valves 24 and 25. Lines 26 indicate that production from other leases in the commingled system, similarly produced and monitored, is combined with the subject lease production. The commingled crude is transported to a field treater facility 27 for separation of remaining BS&W and gas from the oil. Effluent BS&W is discharged from the treater 27 by a line 28 provided with a prover loop 29, the access of which is controlled by valves 30, 31 and 32. Effluent oil from the treater 27 is discharged for collection or transport by line 33, which has a prover loop 34, controlled by valves 35, 36 and 37, in it.

Sensor 19 may be any one of the various kinds of sensing devices which sense the percentage of constituents in the fluid mixture passing it and which produce a signal having a quantitative response indicative of that percentage. One type of sensing device includes electrical circuitry containing a capacitance cell to sense the dielectric constant of a fluid mixture passing through that cell as a means of detecting or sensing the percentage of the constituents in the mixture. (For example, oil has a dielectric constant of from about 2.0 to about 3.0, while water has a dielectric constant of about 80; mixtures of oil and water have dielectric constants ranging between 2 and 80, the particular dielectric constant depending on the percentage of oil and of water in the mixture.) The capacitance cell may be contacted with the fluid mixture by means of a probe inserted in the mixture. The capacitance of the cell is directly proportional to the dielectric constant of the fluid flowing through the cell.

Examples of net oil detectors employing sensing devices having a capacitance cell responsive to fluid mixture dielectric constants include a "Phase Null Cut" detector made by Black, Sivalls and Bryson, Inc., Automation Division, Tulsa, Oklahoma, and a "Net Oil Analyzer" made by the Halliburton Company, Special Products Division, Duncan, Oklahoma.

The Black, Sivalls and Bryson "Phase Null Cut" detector uses an analog signal produced when a capacitance cell, responding to water in it, varies the signal of one of two circuits fed radio frequency energy by a crystal oscillator, and the signals from the two circuits are combined in a coupling network where they are modulated by a chopper, then demodulated by a phase detector, and amplified. The amplified analog signal is applied to a servomotor which turns a balancing capacitor, and the angular movement of the balancing capacitor is used to provide a direct indication of percent BS&W, to position a potentiometer which remotely indicates percent BS&W, and to position the slide of an integrator used to compute the clean oil in the cell of the capacitor.

The Halliburton Net Oil Analyzer receives and combines digital signals from a flowmeter and a sensing device having a capacitance probe and produces a readout of instantaneous flow rate and total net volumes of oil and water which have passed the probe and the fluid meter. As oscillator in the sensing device generates a frequency that varies with the percentage of water in the fluid mixture flowing through the capacitance cell of the probe.

Another type of sensing device senses the density of the fluid mixture passing it by sensing and responding to radiation penetrating the fluid mixture. These devices are based on the fact that absorption of radiation by a liquid increases with an increase in the density of the liquid. An increase in the percentage of water in oil causes an increased density and an increased absorption of radiation. Making use of this fact, one type of pipeline sensor (see, for example, U.S. Pat. No. 3,246,146) deploys a shielded source of radiation (e.g., radium or cobalt) on one side of a pipeline and, on the opposite side, a gamma ray detector, such as a scintillation crystal (e.g., sodium iodine), connected with a photoamplifier tube to produce electrical signals on reception of radiation from the source. The signal produced by the photoamplifier tube is inversely proportional to the density of the fluid mixture passing through the pipeline and reflects the percent of BS&W in the fluid mixture.

In accordance with the present invention, the pipeline sensor 19 is calibrated by arranging a calibrated sensor 38, which may be one of the above-described sensing devices and which generates a reference signal having a quantitative response accurately indicative of the percentage of constituents in a fluid mixture, with the pipeline sensor 19, so that both sensors 19 and 38 each sense essentially the same portion of fluid mixture flowing through the pipeline or fluid passageway 17, and produce a signal having a quantitative response indicative of the percentage of constituents in that portion of fluid mixture. For example, if sensor 19 and 38 are the type of sensing devices which include a capacitance cell in an electrical circuit to sense the dielectric constant of a fluid mixture passing through that cell, sensors 19 and 38 may be so arranged by contacting them with the fluid mixture in the fluid mixture stream, preferably as close together as possible, such as by installing calibrated sensor 38 in prover loop 22 of line 17 and diverting the fluid mixture through that loop.

The sensors 19 and 38 are electrically connected by leads 39 to a receiver 40 which contains electrical circuitry by means of which a selected characteristic of both the reference signal from calibrated sensor 38 and the signal from pipeline sensor 19 are compared contemporaneously with the production of those signals. Receiver 40 reads out that comparison, as by readout display 41. The comparison readout indicates the direction and degree of adjustment that is to be made to pipeline sensor 19 to cause it to respond to a portion of a fluid mixture quantitatively essentially the same as the response of the calibrated sensor 38 to the same portion of fluid mixture. The indicated adjustment is then made, and if desired, the signal of sensors 19 and 38 are compared again. If this check reveals a further adjustment which it is desirable to make, that adjustment is made. Check comparisons and adjustments are made until the pipeline sensor 19 is proved to a desired accuracy, which may be exactly the quantitative response of the calibrated sensor 38.

When the compared signal characteristic from both of the sensors 19 and 38 is pulsar, i.e., digital, the receiver may be a digital counter with ratio capabilities or an integrating digital voltmeter with comparison capabilities. If the signal characteristic from both sensors 19 and 38 is analog in nature, such as a voltage level response, the receiver may be of the voltmeter type, with comparison capabilities, or, if the signals are first fed to means by which analog signals are converted to digital signals, such as a voltage controlled oscillator, receiver 40 may be of the digital counter-ratio capabilities type. If the signal of one sensor is digital and the signal of the other sensor is an analog signal, the analog signal can be converted to a digital signal (as by a voltage controlled oscillator), or the digital signal can be transformed into an analog signal (as with an integrating digital voltmeter), prior to comparison of the signals.

Where receiver 40 is a digital counter with ratio capabilities, the comparison results in a ratio or percentage expression of the selected characteristic of the pipeline and calibrated sensor signals. An example of an instrument incorporating counter circuitry with ratio capabilities is the Monsanto Model 100A counter/timer manufactured by Monsanto Electronics Technical Center, 620 Passaic Avenue, West Caldwell, New Jersey. This kind of counter, in a so-called "ratio mode," can count the number of pulses of an input signal having the higher frequency in the period of the input signal having the lower frequency, and express the resulting ratio on nixie display tubes as a value greater than 1. In a "frequency mode" it can count the number of pulses of a first signal during the time it takes to count the number of pulses of a second signal and then express the count of first signal pulses as a percentage of the second signal pulses on the nixie tubes.

The readout indicates the direction and degree of adjustment which must be made upon the sensing and signal producing device (the pipeline sensor in FIG. 1) to cause it to produce more or less of the selected characteristic in its signal, compared to the quantity of the identical such characteristic in the signal of the calibrated sensor, so that the quantitative response of the sensing and signal-producing device to a physical property of the crude oil is made essentially the same as the quantitative response of the calibrated sensor to that property.

For example, in a case where the selected characteristic of the signals of the sensors is pulsar, and the signals are fed into the above described digital counter in the "frequency mode," with the "second signal" coming from the calibrated sensor 38 and the "first signal" coming from the pipeline sensor 19, a readout of 1.0000 indicates that an equal number of pulses were generated by both sensors during the time it took the pulses of the calibrated sensor to propagate through the counter circuitry, and no adjustment needs to be made to the pipeline sensor. If, however, the readout is 0.9943, it is indicated that the pulsar output of the pipeline sensor is 0.57 percent lower than that of the calibrated sensor. Accordingly, an adjustment is made to the pipeline sensor to increase its pulsar output by an estimated 0.57 percent, and another sample of counts is taken. Since it takes but seconds to take a sample of counts, several samples and adjustments may be made during a separator dump cycle. When the readout expresses a number as close to 1.0000 as desired, say 0.9990, the pipeline sensor is proved, in this example, to an accuracy of one-tenth of 1 percent of the calibrated sensor response.

When receiver 40 is to be voltage responsive, it may suitably be, for example, a dual trace recorder in which one trace marker of the recorder reflects the signal received from the calibrated sensor 38, and the other trace marker reflects the signal from the pipeline sensor 19. By taking the traces of the two markers on graph paper moved past them during a separator dump cycle, one obtains a continuous record comparing the response of both sensors at any instant during the entire period of fluid movement past the location of the sensors. Using the record of comparison, an adjustment in direction and degree which gives the best fit to the recorded traces can be made to the pipeline sensor, and another sample then can be taken as a check, with repetitive adjustments and checks made until the desired calibration of the pipeline sensor is obtained.

Alternative to the dual trace recorder, an oscilloscope with provisions for display of dual traces on its screen may be used, each trace representing one of the input signals from the two sensors. Preferably, the screen will have a grid imposed on it. The direction and degree of adjustment to be made to the pipeline sensor is observed from the comparison of traces on screen. Because a corrective adjustment may be made while the fluid is still passing the sensors, and the consequence of that adjustment immediately checked by viewing the resulting traces, if further adjustment is indicated, another correction and check may be made, and so on, to obtain desired accuracy before the dump cycle of the separation is completed.

The described adjustments made to the sensing and signal producing device, e.g., pipeline sensor 19, may be at the level of either its sensing or signal producing circuitry, including a corrective factoring of the signal from the signal-producing circuitry prior to the comparison of that signal with the input signal from the calibrated sensor 38.

The particular choice of a receiver 40 for use with a type of sensor 38 and 19 will optimize the calibration procedure. For example, the 100 percent BS&W (span) response of the above-described Halliburton capacitance probe is fixed prior to its installation in the pipeline 17 and cannot be reset in the field. Because one response point is fixed, the slope of the pipeline sensor 19 response curve is most easily and accurately determined by cumulating the responses of the calibrated and pipeline sensors produced during substantially an entire ordinary separator dump cycle (using, for example, the above described Monsanto Model 100A device), then making the adjustment indicated by the readout.

On the other hand, to calibrate the above-mentioned Black, Sivalls and Bryson "phase null" capacitance sensor, one must fix the slope of a curve in which both the span and zero responses are mobile. (The fluid mix necessary to produce a span response can be made by closing the water dump valve 13 of the separator so that water spills over into the oil being accumulated in the vessel and gravitates to the bottom of it. Then, on actuation of the dump valve 16 by level control 15, the first fluid discharged will be essentially 100 percent BS&W. The percent BS&W then drops during the dump cycle to a generally low level, which may be zero, at the last portions of the discharge.)

To fix the slope of the response curve of a capacitance sensor in which both the span and zero responses are mobile, it is advantageous to use the dual trace recorder, because it allows simultaneous recordation and comparison of the responses of the two sensors over the entire dump cycle. Consequently, the adjustment can be made on the basis of the degree and direction which gives the best fit of the response curves over the entire spectrum of sensor response from high to low BS&W in the oil. Alternatively, the Monsanto Model 100A counter/timer may be used to calibrate capacitance sensors having neither span nor zero responses fixed by obtaining several readouts of comparisons taken on several sample counts over the entire dump cycle as sensor response varied with high to low BS&W in the oil. The several readings would indicate the adjustment to be made.

The spacing of the two sensors 19 and 38 necessary to view the same percentage of constituents of a fluid mix will depend on how various fluid dynamics factors of a particular installation change the mix of the fluid constituents with distance. Generally speaking, it is desirable to minimize the possibility of a change in mix between sensors, and this is most surely and conveniently proved by placing the sensors as close together as possible. Where the fluid dynamics of an installation permit the fluid mixture to move along the fluid passageway without significant change of the mix constituents, the spacing of the sensors may be as lengthy as desired. In this case, to determine the adjustment to be made to the pipeline sensor, it is advantageous to make the comparison on the basis of responses from the two sensors taken over the entire period of a separator dump cycle, because minor changes in the mix tend to be averaged out by this method. Either the counter/timer or the dual tracer recorder may be used for this purpose. However, if the counter/timer is used with a sensing device in which both span and zero responses must be fixed, it is desirable to employ a time delay switch between the sensors so that the downstream sensor is not energized until the time it takes a cross-sectional segment of fluid (sensed by the upstream sensor) to reach the downstream sensor has expired. That time, in any installation, will depend on the dump rate of the separator and the volume of fluid which can be contained in the fluid passageway separating the sensors.

The sensor 38 may be proved, according to the techniques hereinbefore set forth as know. This is conveniently and most efficaciously performed by quick-connecting the sensor 38 into prover loop 34 into the oil dump line of treater 27 for calibration of zero response against treater effluent oil. It is advantageous to provide the calibrated sensor 38 with quick-connect couplings to expedite the installation of the calibrated sensor in prover loops such as prover loop 22. (Flexible hose interlinking the quick-connect couplings to the calibrated sensor housing may be utilized if variably sized prover loops are incorporated in different separator dump lines in a commingling system.) The quick-connect couplings allow rapid removal from prover loop 34 and installation of standard sensor 38 in the prover loop 29 of the treater BS&W discharge line, where span response and slope of the response curve may be set.

Although the foregoing description focuses upon one application of the present invention, namely the calibration of sensors used to determine the percentage of oil and water in a liquid mixture passing through a fluid passageway, manifestly the general principles of the invention apply as well to the calibrating of sensors used to determine the percentage content of constituents in other fluid mixtures, for example, slurries, in which solids are disposed in a liquid, or a fluid mixture such as a gas in liquid.

Also, while the foregoing description has described both simultaneous and synchronous comparisons made on selected signal characteristics while the signals were being produced, depending on the use of the various combinations of components set forth, it is deemed within the scope of the invention to cumulate the signal inputs of the sensors until the inputs cease and then to make the comparison.

The nature and objects of the present invention, having been fully described and illustrated, what is claimed is:

1. A method of calibrating the BS&W water sensor of a net oil detector, comprising the steps of:
   accumulating crude oil and water produced from an underground formation in a gravity separator to form a body of water separated from at least a part of said crude oil and disposed under a body of crude oil separated from at least a part of said crude oil, discharging said body of water and then said body of crude oil from said separator into a pipeline so as to form therein a continuous stream in which the leading portion has the highest percentage of water and the trailing portion has the lowest percentage of water, said BS&W water sensor of said net oil detector and a calibrated BS&W water sensor being arranged in said pipeline in a spacing permitting them to sense a portion of said stream having essentially the same fluid mixture, said sensors responding on sensing such portion with a signal indicative of the percentage water in said portion, during a sampling period when said sensors are sensing at least a portion of said stream, automatically receiving and comparing a selected characteristic of said signals in automatic receiving and comparing means, and automatically indicating, with automatic indicating means operatively associated with said automatic receiving and comparing means, the direction and degree of adjustment to be made to said BS&W water sensor of said net oil detector to cause the response of such sensor to be essentially the same as the response of said calibrated sensor to said portion of said stream sensed, and adjusting said BS&W sensor of said net oil detector in the direction and to the degree so indicated.

2. The method of claim 1 in which a plurality of portions of said stream are sensed by said sensors in a plurality of sampling periods occurring during a dump cycle of said separator, the BS&W sensor of said net oil detector being adjusted after each sampling period according to the indication of said automatic indicating means.

3. The method of claim 1 in which the entire stream is sensed by said sensors in a sampling period extending over an entire dump cycle of said separator, the BS&W sensor of said net oil detector being adjusted after said sampling period according to the indication of said automatic indicating means.

4. The method of claim 1 in which said selected characteristic of said signals is digital and wherein said direction and degree of adjustment is indicated periodically during said sampling period.

5. The method of claim 1 in which said selected characteristic of said signals is of analog character and wherein said direction and degree of adjustment is indicated instantaneously during said sampling period.

6. A method of calibrating the BS&W water sensor of a net oil detector, comprising the steps of:

accumulating crude oil and water produced from an underground formation in a gravity separator to form a body of water separated from at least part of said crude oil and disposed under a body of crude oil separated from at least a part of said water, discharging the body of water and then the body of oil from the separator into a pipeline so as to form a continuous stream in which the leading portion has the highest percentage of water and the trailing portion has the lowest percentage of water, said BS&W water sensor of said net oil detector and a calibrated BS&W water sensor being arranged in said pipeline in a spacing permitting them to sense a portion of said stream having essentially the same fluid mixture, said sensors responding on sensing such portion with a signal indicative of the percentage of water in said portion, during a first sampling period when said sensors are sensing at least a segment of said leading portion of said stream, automatically receiving and comparing a selected characteristic of said signals in automatic receiving and comparing means, and automatically indicating, with automatic indicating means operatively associated with said automatic receiving and comparison means, the direction and degree of adjustment to be made to said BS&W water sensor of said net oil detector to cause the response of such sensor to be essentially the same as the response of said calibrated sensor when said sensors sense a stream portion having the same percentage water as the segment of said leading portion sensed during said first sampling period, adjusting said BS&W water sensor of said net oil detector in the direction and to the degree indicated in said first sampling period, during a second sampling period when said sensors are sensing at least a segment of said trailing portion of said stream, automatically receiving and comparing in said automatic receiving and comparing means said selected characteristic of the signals produced by said sensors, and automatically indicating with said automatic indicating means the direction and degree of adjustment to be made to said BS&W sensor of said net oil detector to cause the response of such sensor to be essentially the same as the response of said calibrated sensor when said sensors sense a stream portion having the same percentage water as said segment of said trailing portion sensed during said second period, and adjusting the BS&W water sensor of said net oil detector in the direction and to the degree indicated in said second sample period.

7. The method of claim 6 in which said selected characteristic of said signals is digital and wherein said direction and degree of adjustment is indicated periodically during said sampling period.

8. The method of claim 6 in which said selected characteristic of said signals is of analog character and wherein said direction and degree of adjustment is indicated instantaneously during said sampling period.